No. 693,051. Patented Feb. 11, 1902.
M. McCLURE.
VALVE GEAR LINK.
(Application filed May 16, 1901.)
(No Model.)
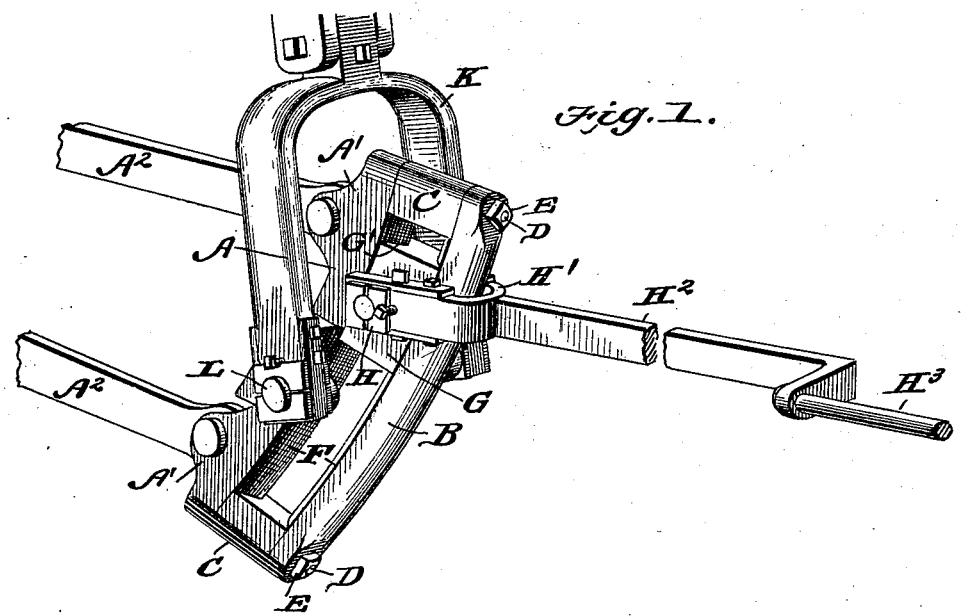
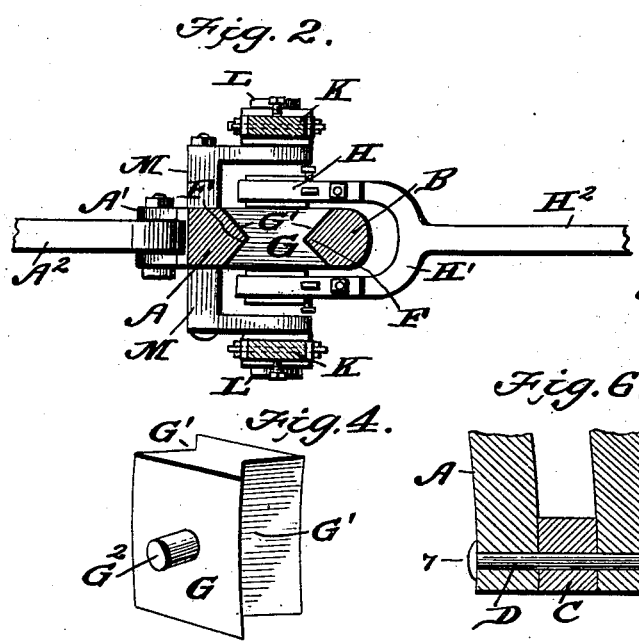
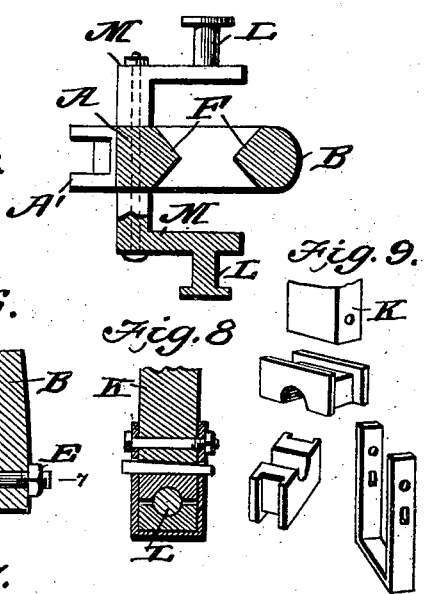
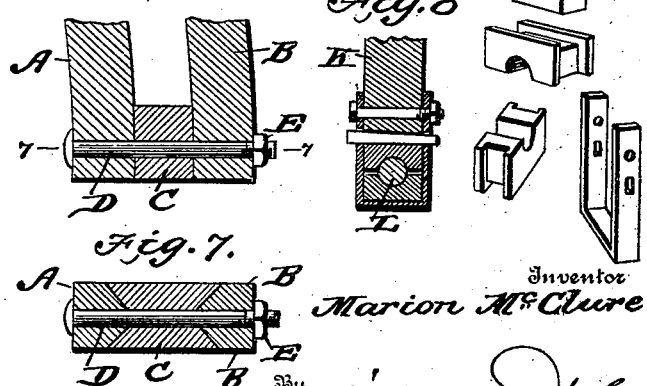
Witnesses
M. A. Bloudel
Claimed Shaw
Inventor
Marion McClure
By
Attorneys
THE NORRIS PETERS CO., PHOTO-LITHO., WASHINGTON, D. C.

UNITED STATES PATENT OFFICE.

MARION McCLURE, OF FELICITY, OHIO.

VALVE-GEAR LINK.

SPECIFICATION forming part of Letters Patent No. 693,051, dated February 11, 1902.

Application filed May 16, 1901. Serial No. 60,574. (No model.)

*To all whom it may concern:*

Be it known that I, MARION MCCLURE, a citizen of the United States, residing at Felicity, in the county of Clermont and State of Ohio, have invented a new and useful Valve-Gear Link, of which the following is a specification.

This invention is an improved construction of link used in connection with the valve-gear of locomotives and other engines employing the link reversing mechanism.

The object of my invention is to provide a link of simple construction which will afford a truer bearing for the valve-rod, and thereby insure a more even and uniform motion of the valve.

Another object is to provide a link in which the wear of the various parts can be quickly and easily taken up and all of said parts readjusted to provide a perfect bearing after the parts have been used for a considerable length of time.

With these objects in view the invention consists in the peculiar construction of the various parts and in their novel combination and arrangement, all of which will be fully described hereinafter, and pointed out in the claims.

In the drawings forming part of this specification, Figure 1 is a perspective view of the link constructed in accordance with my invention. Fig. 2 is a horizontal sectional view, the parts being adjusted so that all of them will show in the said section. Fig. 3 is a detail sectional view taken through the link and more clearly illustrating the connection between the trunnions and link. Fig. 4 is a detail perspective view of the block. Fig. 5 is a detail sectional view taken through the block portions of its trunnions, being also shown in section. Fig. 6 is a vertical sectional view taken through the lower end of the link. Fig. 7 is a section taken on the line 7 7 of Fig. 6. Fig. 8 is a detail sectional view showing the manner of connecting the saddle with the trunnion, and Fig. 9 is a view showing the parts illustrated in Fig. 8 as detached.

In carrying out my invention I employ a link composed of the side members A and B and the top and bottom members C. The side member A is formed with the usual ears A', to which the eccentric-rods $A^2$ are pivoted. The top and bottom pieces C are securely fastened between the upper and lower ends, respectively, of the side members A and B by means of suitable bolts D and ends E. The inner or opposing faces of the side members A and B are formed with a double bevel, as indicated at F, and sliding within the link so constructed is the block G, having a V-shaped groove G' cut in its opposing sides, so that the said block will fit snugly within the link and embrace the double bevel of the side members, thereby insuring a steady movement of the block within the link. The block G is also formed with integral trunnions $G^2$, which are journaled in bearings H, connected to the yoke H', formed upon the end of the valve-operating bar $H^2$, said bearing being connected to the valve-rod $H^3$ in any suitable manner. The bearing H, into which the trunnions $G^2$ are journaled, is of the usual form of sectional bearing held together by a strip, the wear being taken up by cotter-pins in the usual manner. The details of the bearings are clearly illustrated in Figs. 8 and 9. The link is supported by means of a saddle K, said saddle straddling the link, as usual, and has bearings in its lower ends similar to those already described and in which are journaled trunnions L, formed upon the outer sides of the right-angular plates M, bolted to the side member A of the link midway its length, one set of bolts being sufficient to securely fasten both plates, thereby insuring perfect alinement of the trunnions. This connection between the link and saddle has been found to be very efficient, and by constructing the link with the double bevel edges and grooving the block to correspond a uniformly true action of all of the parts is secured.

Inasmuch as the side members A and B are beveled from end to end the top and bottom members C are grooved at each end to receive the said bevel edges, and if the parts should become worn to any considerable extent the bolts D can be removed and the grooves in the top and bottom pieces C filed a sufficient amount to permit the parts to be reassembled and fit snugly into the grooved block G, thereby avoiding all lost motion occasioned by the wear of the parts.

It will thus be seen that I provide a simple and effective valve-gear capable of carrying out all of the objects mentioned in the fore part of this specification.

Having thus fully described my invention, what I claim as new, and desire to secure by Letters Patent of the United States, is—

1. The combination with a link, of the right-angular plates fastened upon opposite sides of one of its side members, trunnions formed integral with the said angular plates, and the saddle having the bearings into which the trunnions are journaled, substantially as shown and described.

2. In a device of the kind described, the combination with a link having the inner faces of its side members formed with a double bevel, of the block having V-shaped grooves adapted to slide within the link, said block having trunnions formed integral therewith, the valve-operating rod carrying bearings to receive the trunnions on the block, right-angular plates having trunnions and the saddle having bearings at its ends, adapted to receive the trunnions carried by the angular plates, all arranged and adapted to operate, substantially as shown and described.

MARION McCLURE.

Witnesses:
LAFAYETT MAYER,
WILLIAM L. YOUNG.